Nov. 30, 1926.                J. H. BURLINGHAM                1,608,767
                               SCRAPER FOR STILLS
                              Filed June 11, 1920
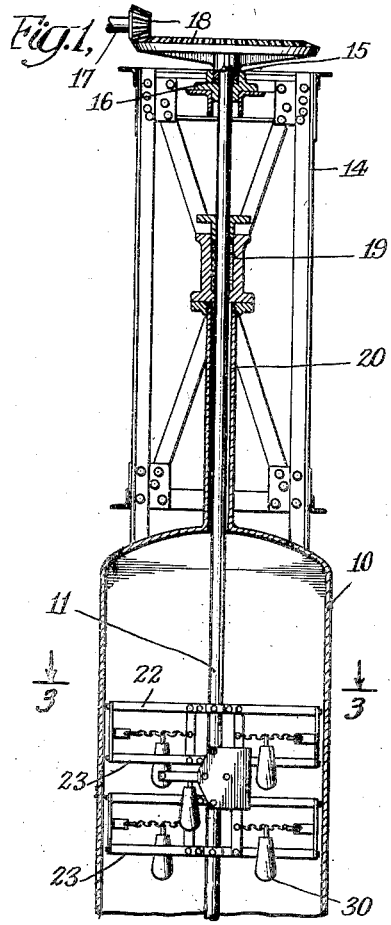
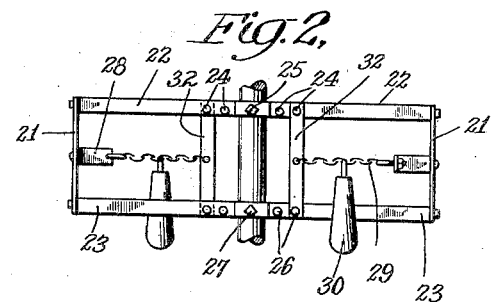
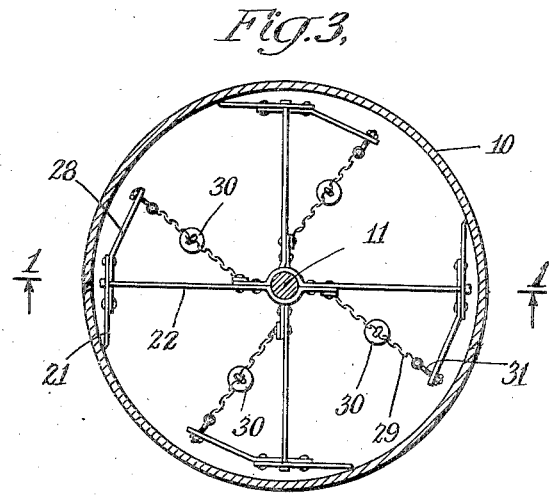
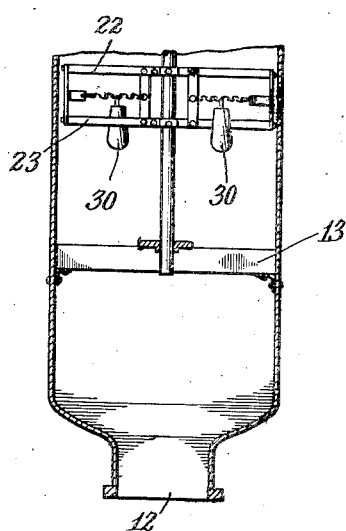
Inventor
James H. Burlingham
By his Attorney Patented Nov. 30, 1926.

1,608,767

UNITED STATES PATENT OFFICE.

JAMES H. BURLINGHAM, OF PORT ARTHUR, TEXAS, ASSIGNOR TO THE TEXAS COMPANY, A CORPORATION OF TEXAS.

SCRAPER FOR STILLS.

Application filed June 11, 1920. Serial No. 388,187.

This invention relates to apparatus for removing carbon and coke deposits from oil stills and has special reference to mechanism designed for keeping free of carbon the walls of stills used for cracking hydrocarbon oils.

Constant effort is being made to convert higher boiling hydrocarbons into lower boiling ones by subjecting the higher boiling oil to such temperatures and pressures that molecular decomposition results and lower boiling hydrocarbons are formed. In carrying on this destructive distillation there are always formed large quantities of carbon which readily adhere to the heated still surfaces, building up tenacious deposits thereon and causing the over heating of the metal surfaces and their rapid deterioration. It is an object of my invention to provide suitable mechanism for removing the carbon from the heated walls of pressure stills.

In the course of a run in which the oil is subjected to the temperatures and pressures commonly sought to be employed for cracking purposes the stills are subjected to great strain and contortions in the form of the stills frequently occur. It is an object of my invention to provide a scraping mechanism that will readily adjust itself to variations in the diameter or contour of a still and will at all times present a scraping edge against the periphery of the still.

Other objects and advantages of my invention will appear from the following detailed description thereof.

Referring to the drawings:

Figure 1 is a vertical section of an apparatus constructed in accordance with my invention and constituting an embodiment thereof taken on the line 1—1 of Figure 3.

Figure 2 is a detail of the apparatus showing a single pair of scrapers and drawn to a larger scale than Figure 1.

Figure 3 is a cross section on the line 3—3 of Figure 1.

Figure 4 is a cross section of a modified form of the invention.

10 designates a still adapted to contain oil and to withstand the temperatures and pressures used in the cracking of hydrocarbon oils. The still is supported in a suitable furnace or otherwise supplied with heating means and is equipped with such charging lines, vapor lines, and other accessories as may be required and which it is unnecessary to describe or illustrate herein. The still illustrated is of the vertical type. Mounted within the still is a shaft 11 which carries the scrapers adapted for removing the carbon from the walls of the still. The shaft may be journaled and supported at the bottom of the still and in some cases I have used such a construction. However, in the type of still illustrated the manhole 12 is located at the bottom of the still and the shaft 11 is therefore journaled by means of a suitable angle iron support 13. This construction is a very desirable one inasmuch as it leaves an unobstructed carbon or residue collecting space in the bottom of the still. It is preferable to merely center the shaft by means of the support 13 and to support the shaft upon a framework 14 secured at the top of the still, the shaft being provided with the set collar 15 and being suitably journaled at 16. The shaft is rotated by means of the shaft 17 through the gears 18.

When using my invention in the distillation of oils at high temperatures and pressures special care must be taken to provide a suitable stuffing box for the shaft. A convenient way of accomplishing this result is to provide stuffing box 19 elevated above the top of the stills by means of the pipe 20. The pipe 20 is of sufficient diameter to accommodate the shaft 11 and leave an annular space within the pipe. Since vapor is a relatively poor conductor of heat the stuffing box may be so elevated that the loss of heat due to radiation will overcome the conduction of heat and in this manner keep the stuffing box in a comparatively cool condition.

I have found it convenient to construct the scrapers in pairs and such a construction is illustrated in the drawings. In order to fully explain the invention I will now describe the arrangement of a pair of scrapers arranged as shown in the drawings. Each scraper 21 is connected to the shaft 11 by means of an upper scraper arm 22 and a lower scraper arm 23, the upper scraper arms of a given pair of scrapers being fastened together by means of bolts 24 and secured to the shaft by a set screw 25. In a similar manner the lower arms of each pair of scrapers are fastened together by bolts 26 and secured to the shaft by means of the set screw 27. Each scraper is rigidly fastened to a scraper lever 28, the scraper being loosely mounted upon the scraper arms so that when leverage action is taken upon the member 28 the scraper will move with a hinge movement upon the arms. Each scraper is provided with a chain 29 carrying a weight 30, one end of the chain being secured to the lever 28 in any suitable manner, as by means of an eye bolt 31, and the other end being so secured that the weight will hang upon the chain and thus the action of gravity will be exerted upon the lever. For example, one end of the chain may be fastened to a cross-piece 32.

In this form of construction a given portion of the still surface is swept by two scrapers, the scrapers being installed in successive pairs along the portion of the still which it is desired to scrape. For example, in the construction I have actually employed the scrapers have been arranged so as to scrape only that portion of the still which was subjected to direct furnace heat; the upper vapor portion which extended beyond the brickwork and the lower carbon receiving portion which extended below the combustion chamber were not subjected to the action of the scrapers. A convenient method of arranging the scrapers is to have every other pair of scrapers in the same vertical plane, with successive pairs at substantially right angles to each other. In this way an overlapping of the scrapers is provided, as is clearly shown in Figure 1.

It is to be observed that the scraper illustrated in Figure 3 is of the push type since the force operating each scraper is exerted at a point from behind the scraping edge of the scraper. I believe that this push type is the most desirable form. However I have used in commercial practice a drag type of scraper such as is shown in Figure 4. In the latter type the arrangement in general is similar to the form shown in Figures 1, 2, and 3 except that each scraper is so mounted on its arms 22 and 23 and each lever 28 is so arranged that the force operating the scraper is exerted at a point in front of the scraper blade so that the scrapers are in this arrangement dragged rather than pushed.

In operation when the shaft 11 is rotated the scrapers are caused to scrape the surface of the still and remove the carbon deposited thereon. Through the action of gravity upon the weights 30 each chain 29 exerts a pull on its respective lever 28 thus operating to hold each scraper against the still surface regardless of contortions in the still or variations in the diameter thereof. The carbon collects in the bottom of the still from where it may readily be withdrawn.

What I claim is:

1. In apparatus for scraping stills, a rotatable shaft, a plurality of pairs of arms, a scraper loosely mounted on each pair of arms, a lever attached to each scraper, a chain attached to each lever, a weight carried by each chain whereby each scraper is adjustably held against the wall of the still.

2. In apparatus for scraping the inner curved walls of a vertical still, a vertically disposed rotatable shaft journaled in the still with its lower end terminating above the bottom of the still to leave a residue space below, a plurality of pairs of spaced scraper arms connected to the shaft and each pair comprising an upper and a lower arm, a scraper loosely mounted between the outer ends of each pair of arms, a lever attached at one end to each scraper, a chain attached at one end to the free end of each lever with its other end attached to one of the scraper arms, and a weight suspended from the chain so that by reason of the action of gravity the weights will exert a pull upon the levers to hold the scrapers against the walls of the still.

In witness whereof I have hereunto set my hand this 1st day of June, 1920.

JAMES H. BURLINGHAM.